United States Patent [19]

Walker et al.

[11] Patent Number: 5,437,854
[45] Date of Patent: Aug. 1, 1995

[54] PROCESS FOR PURIFYING ZIRCONIUM TETRACHLORIDE

[75] Inventors: Roy G. Walker; Carlos L. Aguilar, both of Ogden, Utah

[73] Assignee: Westinghouse Electric Corporation, Pittsburgh, Pa.

[21] Appl. No.: 265,910

[22] Filed: Jun. 27, 1994

[51] Int. Cl.$^6$ .................. C01G 25/04; C01G 27/04
[52] U.S. Cl. ...................... 423/492; 423/73; 423/76; 423/77; 423/DIG. 12; 75/692
[58] Field of Search .................. 423/492, 73, 76, 77, 423/DIG. 12; 75/692

[56] References Cited

U.S. PATENT DOCUMENTS

| | | | |
|---|---|---|---|
| 2,618,531 | 11/1952 | Lindblad | 423/77 |
| 2,791,485 | 5/1957 | Newnham | 423/73 |
| 2,816,814 | 12/1957 | Plucknett | 23/294 R |
| 2,885,281 | 5/1959 | Newnham | 423/73 |
| 2,916,350 | 12/1959 | Newnham | 423/76 |
| 2,953,433 | 9/1960 | Newnham | 423/76 |
| 2,961,293 | 11/1960 | Newnham | 423/76 |
| 3,388,993 | 6/1968 | Peterson et al. | 423/77 |
| 4,637,831 | 1/1987 | Stoltz et al. | 75/615 |
| 4,874,475 | 10/1989 | McLaughlin et al. | 423/492 |
| 4,913,778 | 4/1990 | Lee et al. | 423/492 |

FOREIGN PATENT DOCUMENTS 810822  3/1959  United Kingdom ............. 423/492

*Primary Examiner*—Wayne A. Langel
*Assistant Examiner*—N. M. Nguyen

[57] ABSTRACT

Zirconium tetrachloride containing hafnium tetrachloride is selectively reduced with liquid metallic tin to produce zirconium trichloride. The hafnium tetrachloride is then separated as a vapor from a slurry of zirconium trichloride and other solids, including stannous dichloride, in liquid metallic tin.

12 Claims, 1 Drawing Sheet

PROCESS FOR PURIFYING ZIRCONIUM TETRACHLORIDE

BACKGROUND OF THE INVENTION

The invention relates to a process for purifying zirconium tetrachloride and, more particularly, to a process for separating hafnium tetrachloride contaminants from zirconium tetrachloride for producing nuclear grade zirconium.

Zircon and other natural sources of zirconium typically contain from about 0.1% up to about 2.5% hafnium based upon the zirconium content. However, hafnium is considered a contaminant in nuclear grade zirconium and must be reduced to very low levels. Similarly, the specifications for nuclear grade hafnium limit the concentration of zirconium to very low levels. Unfortunately, zirconium and hafnium have similar properties and are very difficult to separate. In commercial processes for producing nuclear grade zirconium, zirconium oxide contaminated with hafnium oxide is chlorinated to produce a mixture of zirconium tetrachloride and hafnium tetrachloride. The mixture of tetrachlorides is then dissolved in an aqueous acid and the metals are separated in a liquid-liquid extraction operation using organic solvents such as methyl isobutyl ketone and the like. The separated zirconium may then be reduced to metallic form by reduction with magnesium in a Kroll Process. Although liquid-liquid extraction operations effectively separate these metals, these types of operations employ large quantities of organic solvents and other chemicals which results in ongoing environmental and operating problems. It would therefore be desirable to separate zirconium and hafnium by other means which would not employ organic solvents.

It was proposed as early as the 1950s to separate zirconium tetrachloride from hafnium tetrachloride by first reducing zirconium tetrachloride to zirconium trichloride with a reducing agent such as iron ($E_o = 0.771$ volts), aluminum ($E_o = 1.662$ volts) or zirconium dihalide and then separating the zirconium trichloride from the hafnium tetrachloride. See, e.g., U.S. Pat. Nos. 2,961,293; 2,953,433; 2,916,350; 2,885,281 and 2,791,485. However, later testing has shown that iron and aluminum undesirably tend to reduce the hafnium tetrachloride along with the zirconium tetrachloride so that the zirconium cannot be effectively purified. In addition, the solid-solid reactions between the zirconium tetrachloride on one hand and the iron or aluminum reductant on the other hand tend to be relatively inefficient. Further, iron and aluminum are considered to be contaminants in zirconium and its alloys and are closely controlled.

It has also been proposed to reduce zirconium tetrachloride with hydrogen ($E_o = 0$ volts), but it has been found that hydrogen will not reduce zirconium tetrachloride unless atomic hydrogen is generated as a preliminary step.

Thus, the art has not developed a practical alternative to liquid-liquid extraction and like operations for purifying zirconium tetrachloride.

SUMMARY OF THE INVENTION

It is an object of the present invention to purify zirconium contaminated with hafnium tetrachloride by a practical alternative to liquid-liquid extraction and like operations. It is a further object to react the zirconium tetrachloride to another form which may be readily separated from unreacted hafnium tetrachloride. It is an additional object to separate the zirconium and the hafnium from the reductant so that the reductant can be recycled to reduce additional quantities of zirconium tetrachloride.

With these objects in view, the present invention resides in a process for purifying zirconium tetrachloride by first reacting a mixture of zirconium tetrachloride and hafnium tetrachloride with liquid metallic tin to reduce the zirconium tetrachloride to zirconium trichloride while oxidizing the tin to stannous dichloride. A hafnium tetrachloride-containing vapor from the reaction step is then separated from liquid metallic tin containing zirconium trichloride and stannous dichloride. Preferably, the zirconium tetrachloride-tin reaction is conducted at a temperature of between about 320° C. and about 450° C., the sublimation points (at atmospheric pressure) of hafnium tetrachloride and stannous dichloride, respectively.

In a preferred practice, the liquid metallic tin separated from the hafnium tetrachloride vapors is then separated from the zirconium trichloride and the stannous dichloride reaction products for recycling the tin to the zirconium tetrachloride-tin reaction step. The zirconium trichloride is vaporized from the stannous dichloride to separate the zirconium trichloride from the stannous dichloride for ultimate recovery of zirconium with low levels of hafnium by downstream operations, which are not part of the present invention. The stannous dichloride separated from the zirconium trichloride is chlorinated to produce stannic tetrachloride vapors for leaving a residue primarily comprising unreacted carbon and silica introduced with the feed materials. The stannic tetrachloride is then reduced to metallic tin with a reducing agent selected from the group consisting of magnesium and sodium. The tin produced from the stannic tetrachloride reduction step is recycled to the zirconium tetrachloride-tin reaction step for reducing additional quantities of zirconium tetrachloride.

Advantageously, it has been found that tin is able to selectively reduce zirconium tetrachloride even though it is only slightly more reactive than hydrogen ($E_o = 0$ volts); i.e., it has a half reaction of only 0.1375 volts. Also, tin (melting point of about 232° C.) is a liquid and zirconium trichloride is a solid at reaction temperatures of from 320° C. (the sublimation point of hafnium tetrachloride) up to about 450° C. (the sublimation point of zirconium trichloride) so that the zirconium tetrachloride may be readily reduced by a liquid reductant to form zirconium trichloride solids, which will slurry with the liquid metallic tin rather than vaporize. At reaction temperatures of from about 320° C. to about 330° C. (the sublimation point of zirconium tetrachloride at atmospheric pressure), the unreacted zirconium tetrachloride will also be a solid which tends to remain in the slurry rather than vaporize with the hafnium tetrachloride. However, higher reaction temperatures of from about 330° C. to about 450° C. are preferred in most cases (particularly where nuclear grade hafnium is not being produced) because the reduction reaction proceeds at a faster rate at higher temperatures. In addition, the most common zirconium alloys (Zircaloy 2 and Zircaloy 4) may contain up to about 1.2% or more tin so that tin contamination is not a concern in many cases.

Figure 1:
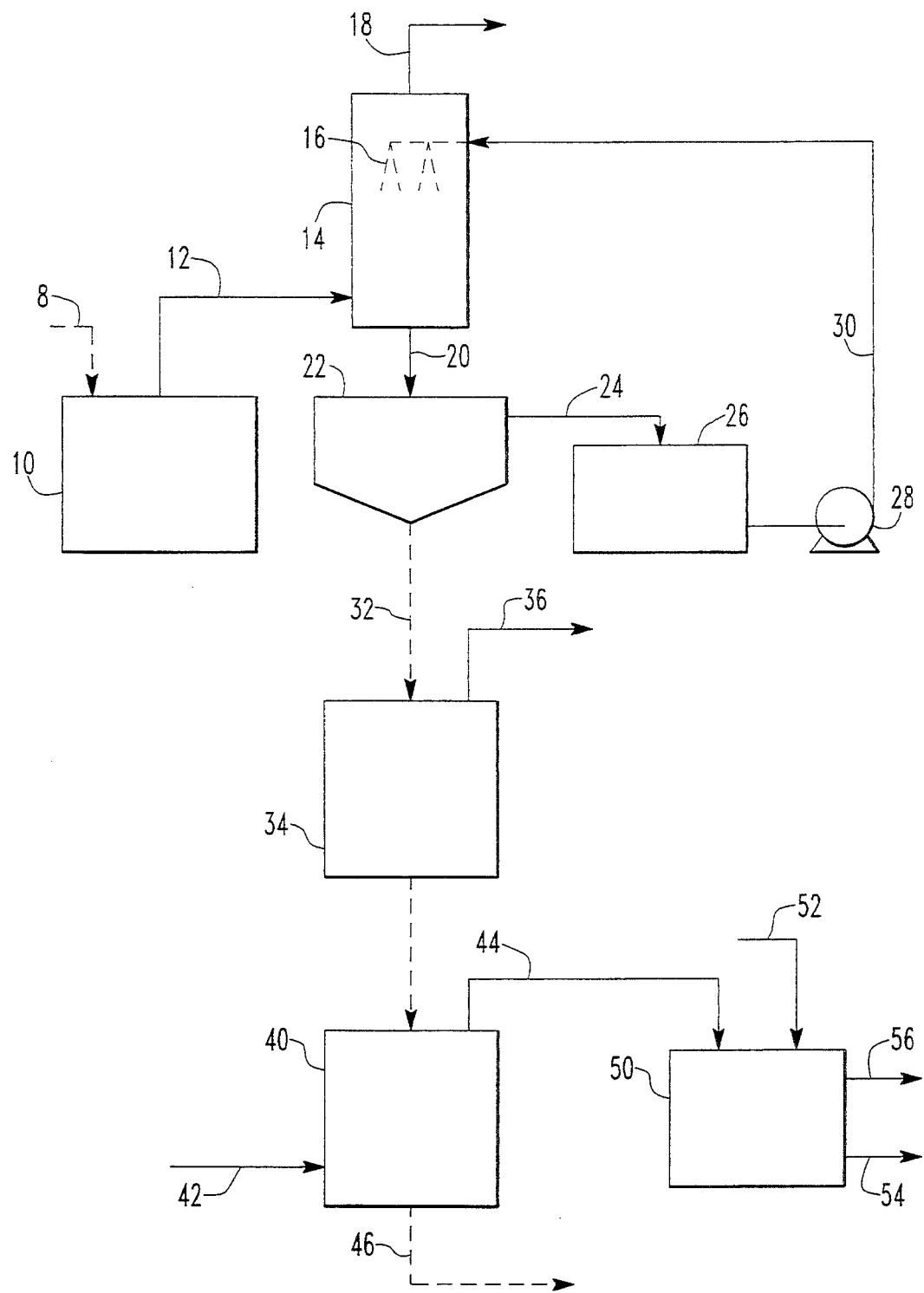
FIG. 1 is a block diagram of the preferred practice of the present invention.

The invention as set forth in the claims will become more apparent from the following detailed description of a preferred practice thereof illustrated, by way of example only, in the accompanying block flow sheet.

DESCRIPTION OF THE PREFERRED PRACTICE

Two preliminary qualitative tests were conducted to determine whether tin would reduce zirconium tetrachloride. In the first test, four grams of crude zirconium tetrachloride (contaminated with about 2.5% hafnium tetrachloride) from a commercial chlorination plant and one gram of tin (which is the approximate stoichiometric equivalent of four grams of zirconium tetrachloride) were placed in a one half inch diameter by eighteen inch long stainless steel pipe reactor. The pipe was held in an oven at about 350° C. After five and one half hours at reaction temperatures, the pipe was cut open and found to contain a soft gray powder (simulating a zirconium trichloride reaction product) at its hot end and a crusty white powder (simulating a hafnium tetrachloride byproduct) at its cold end with clean pipe surface between the ends. The gray powder (also containing stannous dichloride and possibly unreacted tin and zirconium tetrachloride) from the hot end contained 1.66% hafnium (based upon zirconium in the gray powder) whereas the white powder (also containing sublimed zirconium tetrachloride) from the cold end contained 2.5% hafnium (based upon zirconium in the white powder). Thus, this elementary test demonstrated that the hafnium content of zirconium tetrachloride can be reduced by at least about 20% using tin as a reductant.

In a second preliminary test, crude zirconium tetrachloride (containing about 2.5% hafnium based upon zirconium) and tin were reacted in a three-neck glass flask at about 350° C. at atmospheric pressure. This test eliminated any possible affect of the stainless steel composition (and particularly of iron) of the pipe reactor on the reduction of zirconium tetrachloride and hafnium tetrachloride. After about three hours, the flask was examined and found to contain a gray powder (simulating a zirconium trichloride product) and a crusty white powder (simulating a hafnium tetrachloride byproduct). During this test, a white smoke was generated which likely contained hafnium tetrachloride vapors. The gray powder was found to contain 1.06% hafnium (based upon zirconium in the gray powder) and the white powder was found to contain 1.5% hafnium (based upon zirconium in the white powder). Thus, the hafnium tetrachloride content of the crude zirconium tetrachloride was reduced by more than 50%. The gray powder was then placed in the stainless steel pipe reactor and heated at about 414° C. for about six and one half hours. The gray powder from the pipe reactor was found to contain 0.40% hafnium (based upon zirconium in the gray powder). Thus, the hafnium tetrachloride content of the crude zirconium tetrachloride was reduced by about 80%.

The accompanying flow sheet shows a process wherein a zirconium tetrachloride and hafnium tetrachloride powder mixture 8 is vaporized (i.e., sublimed) in a vaporizer 10 at about 330° C. to about 450° C., and preferably at about 350° C. to about 420° C., and at about atmospheric pressure. Preferably, the vaporizer 10 is constructed of zirconium or other material which does not readily reduce hafnium tetrachloride. In the Applicant's plant, crude zirconium tetrachloride powder contaminated with about 0.5% to about 2.5% hafnium tetrachloride (based upon zirconium tetrachloride) is produced by the carbochlorination of zircon sand in a chlorinator to produce a vapor predominantly containing zirconium, hafnium and silicon tetrachlorides followed by the selective condensation of the mixture of zirconium tetrachloride and hafnium tetrachloride powder from a predominantly silicon tetrachloride vapor at a temperature of about 300° C. The zirconium tetrachloride-containing powder normally is contaminated with unreacted carbon and silica and residual amounts of various metal chlorides.

The vapors then flow from the vaporizer 10 through piping 12 to a tin scrubber 14 or other liquid contacting device, where the vapors react with recirculating liquid tin. The tin selectively reduces the zirconium tetrachloride to zirconium trichloride and the tin is oxidized to stannous dichloride. At reaction temperatures of 330° C. to 450° C., the zirconium trichloride and the stannous dichloride are solids which form a slurry with the recirculating liquid tin. As shown in the process flow sheet, the vapors in piping 12 may be introduced into the bottom of the scrubber 14 and rise countercurrently against liquid tin from spray orifices or nozzles 16. As shown, a single stage spray unit in the scrubber 14 may be employed. However additional stages and high tin/zirconium tetrachloride feed ratios may also be employed to obtain higher purities. Preferably, the zirconium tetrachloride-containing powder is contacted with an equal weight of metallic tin (which, in the present case where the powder is at least about 95% zirconium tetrachloride, is four times the stoichiometric ratio) or more so that the zirconium tetrachloride may be effectively reduced to zirconium trichloride and the zirconium trichloride slurry maintained. Preferably, the scrubber 14 is fabricated of zirconium or similar material which does not tend to reduce hafnium tetrachloride.

The hafnium tetrachloride-containing vapor then flows from the tin scrubber 14 through piping 18 and is condensed and recovered in a downstream operation (not shown). For example, the hafnium tetrachloride may be reduced (not shown) with magnesium or sodium to produce metallic hafnium.

The liquid tin slurry flows from the tin scrubber 14 through piping 20 to a solid-liquid separating device such as a clarifier 22 for separating the solid reaction products from the liquid tin. As shown in the flow sheet, liquid tin overflows from the clarifier 20 through a pipe 24 into a liquid tin recycle tank 26. The liquid tin is then circulated by a pump 28 through a pipe 30 to the sprays or nozzles 16 in the tin scrubber 14 for reducing additional zirconium tetrachloride. The tin circulated by the pump 28 must be at least about 232° C. to prevent freezing. A heat exchanger (not shown) may be employed in the recycle tank 26 or in line 30 for maintaining the process temperature of the tin.

The underflow from the clarifier 22 may be screened (not shown) and fed to a sublimer 34 for subliming the zirconium trichloride solids at a temperature of at least about 330° C. and preferably at about 450° C. to about 550° C., and most preferably about 500° C. The sublimer 34 may be maintained at its process temperature by an induction heater (not shown) and operated on a batch basis. The zirconium trichloride may disproportionate in the sublimer 34 to form zirconium tetrachloride and zirconium dichloride so that the sublimed vapors in pipe 36 from the sublimer 34 may comprise varying amounts of zirconium tetrachloride, zirconium trichloride and zirconium dichloride. The sublimed vapors may then be reduced in a later operation (not shown) with magnesium or sodium to produce metallic zirconium.

The solids from the sublimer 34 are fed to a chlorinator 40 for chlorinating the stannous dichloride to produce stannic tetrachloride vapor. The chlorinator may be operated at a temperature of from about 650° C. (the boiling point of stannous dichloride) to about 700° C. and preferably at a temperature of about 660° C. and at about atmospheric pressure to promote a vapor phase reaction between stannous dichloride vapors and chlorine gas or other suitable source of chlorine. The chlorine gas may be fed to the chlorinator 40 by a feed pipe 42. Stannic tetrachloride vapor in pipe 44 from the chlorinator 40 may then be cooled to temperatures as low as about 120° C. (the boiling point of stannic tetrachloride). The stannic tetrachloride vapor may be cooled in stages to selectively condense zirconium chlorides which may have carried into the chlorinator 40. Advantageously, the stannic tetrachloride may be separated from the carbon, silica and other residuals in residue 46 which are not vaporized in the sublimer 34 or the chlorinator 40.

The tin tetrachloride from the chlorinator 40 is fed to a reduction furnace 50 where the tin tetrachloride is reduced to metallic tin with magnesium 52. The metallic tin is then recycled 54 to the tin scrubber 14 via the tin recycle tank 26 or by other means to reduce additional zirconium tetrachloride. Magnesium dichloride 56 which is produced in the reduction furnace 50 may be mixed with magnesium dichloride produced in the production of zirconium or hafnium sponge by Kroll processes and sold as a byproduct. Alternatively, the tin tetrachloride may be reduced with sodium.

While a present preferred practice of the present invention has been illustrated and described, it is to be understood that the invention may be otherwise variously embodied within the scope of the following claims of invention.

We claim:

1. A process for separating hafnium tetrachloride contaminants from zirconium tetrachloride, comprising the steps of:
   reacting a mixture of zirconium tetrachloride and hafnium tetrachloride with liquid metallic tin to reduce the zirconium tetrachloride to zirconium trichloride while oxidizing the tin to stannous dichloride; and
   separating from the reaction step a hafnium tetrachloride-containing vapor from liquid metallic tin, the liquid containing zirconium trichloride and stannous dichloride.

2. The process of claim 1, wherein the reaction step is conducted at a temperature of from about 320° C. to about 450° C.

3. The process of claim 1, wherein the reaction step is conducted at a temperature of about 320° C. to about 330° C.

4. The process of claim 1, wherein the reaction step is conducted at a temperature of about 330° C. to about 420° C.

5. The process of claim 1, wherein the hafnium/zirconium weight ratio of the mixture of zirconium tetrachloride and hafnium tetrachloride is reduced in the reduction step by at least 20%.

6. The process of claim 1, wherein the hafnium/zirconium weight ratio of the mixture of zirconium tetrachloride and hafnium tetrachloride is reduced in the reduction step by at least 50%.

7. The process of claim 1, wherein the hafnium/zirconium weight percent ratio of the mixture of zirconium tetrachloride and hafnium tetrachloride is reduced in the reduction step by at least 80%.

8. The process of claim 1, wherein the mixture of zirconium tetrachloride and hafnium tetrachloride is contacted with at least an equal weight of liquid tin.

9. The process of claim 1, comprising the additional steps of:
   separating the zirconium trichloride and stannous dichloride from the liquid metallic tin;
   recycling the separated liquid metallic tin to the zirconium tetrachloride-tin reaction step;
   subliming the zirconium trichloride to produce sublimed vapors comprising zirconium tetrachloride, zirconium trichloride and zirconium dichloride;
   removing said sublimed vapors from the stannous chloride
   chlorinating the stannous dichloride to produce stannic tetrachloride vapor;
   reducing the stannic tetrachloride with a reducing agent selected from the group consisting of magnesium and sodium to produce metallic tin; and
   recycling the tin produced in the stannous dichloride reduction step to the zirconium tetrachloride-tin reaction step.

10. The process of claim 9, wherein the tin reacts with the zirconium tetrachloride at a temperature of from about 320° C. to about 450° C.

11. The process of claim 9, wherein the tin reacts with the zirconium tetrachloride at a temperature of from about 320° C. to about 330° C.

12. The process of claim 9, wherein the tin reacts with the zirconium tetrachloride at a temperature of from about 330° C. to about 420° C.

* * * * *